United States Patent

Kimura et al.

Patent Number: 5,952,401
Date of Patent: Sep. 14, 1999

[54] INK FOR USE IN INK-JET RECORDING

[75] Inventors: Makiko Kimura, Sagamihara; Hiroshi Sugitani, Machida; Masami Ikeda, Yokohama; Kiyomi Aono, Kokubunji; Hiromichi Noguchi, Atsugi; Yoshie Nakata, Kawasaki, all of Japan

[73] Assignee: Canon Kabushiki Kaisha, Tokyo, Japan

[21] Appl. No.: 08/801,424

[22] Filed: Feb. 18, 1997

Related U.S. Application Data

[63] Continuation of application No. 08/353,689, Dec. 12, 1994, abandoned.

[30] Foreign Application Priority Data

Dec. 14, 1993 [JP] Japan .................... 5-313611

[51] Int. Cl.⁶ .................... C09D 5/00; C09D 11/00
[52] U.S. Cl. .................... 523/161; 522/85; 522/86
[58] Field of Search .................... 523/161; 524/714; 522/85, 86

[56] References Cited

U.S. PATENT DOCUMENTS

| | | | |
|---|---|---|---|
| 4,978,969 | 12/1990 | Chieng | 346/1.1 |
| 5,160,370 | 11/1992 | Suga et al. | 106/20 |
| 5,172,133 | 12/1992 | Suga et al. | 346/1.1 |
| 5,229,786 | 7/1993 | Suga et al. | 346/1.1 |
| 5,354,369 | 10/1994 | Shimomura et al. | 106/22 H |

FOREIGN PATENT DOCUMENTS

| | | |
|---|---|---|
| 0337705 | 10/1989 | European Pat. Off. |
| 0407054 | 1/1991 | European Pat. Off. |
| 0540757 | 5/1993 | European Pat. Off. |
| 52-142516 | 11/1977 | Japan . |
| 5186725 | 7/1993 | Japan . |

OTHER PUBLICATIONS

Derwent Abstract (WPI) No. 93-269962 with respect to Japanese Patent Document No. 5-186725 (Jul. 27, 1993).

*Primary Examiner*—James J. Seidleck
*Assistant Examiner*—U. K. Rajguru
*Attorney, Agent, or Firm*—Fitzpatrick, Cella, Harper & Scinto

[57] ABSTRACT

Disclosed herein is an ink comprising a pigment, a water-soluble resin, a water-soluble monomer to be set by application of energy and a photopolymerization initiator in an aqueous liquid medium.

10 Claims, 4 Drawing Sheets

INK FOR USE IN INK-JET RECORDING

This application is a continuation of application Ser. No. 08/353,689, filed Dec. 12, 1994, now abandoned.

BACKGROUND OF THE INVENTION

1. Field of the Invention

The present invention relates to an ink, in particular, an ink suitable for use in recording on media lacking in ink absorptiveness, and an ink-jet recording method using such an ink and ink-jet instruments applying the ink thereto.

2. Related Background Art

Inks for ink-jet recording apparatus in which a liquid ink is ejected from a nozzle of a head to effect printing include water-based inks in which a dye as a coloring material is dissolved in an aqueous solvent, and solid inks in which a dye is dissolved in a waxy solvent setting at ordinary temperature and ejecting the solid solution from a head in a heat melted state.

Ink-jet recording inks of the ultraviolet-curing type include those using a water-soluble dye as described in Japanese Patent Application Laid-Open No. 5-186725, by which printing on plain paper and regenerated paper can be conducted with ease.

As a method of forming images on a plastic sheet or plate, a sublimable dye is used in an ultraviolet-curing resin as described in Japanese Patent Application Laid-Open No. 52-142516.

The following problems are, however, involved in the prior art.

1. When water-based ink is used in color printing, for example, when printing is conducted with an ink of a first color and then with another ink of a second color after the first ink is dried, the first color ink is redissolved in the second color ink if the dots of the second color ink overlap the dots of the first color ink, whereby bleeding occurs, and the quality of the resulting print is hence deteriorated.
2. Since water-based ink makes good use of the penetrability of the solvent into paper, it takes a lot of time to dry the ink, and moreover images with good rub-off resistance cannot be formed if a plastic is used as the recording medium. Media intended for recording are therefore limited to paper.
3. In the ink in which an ultraviolet-curing resin is mixed with a water-soluble dye, the dye does not bleed if water is applied again to the ink after printing. However, fading of the color of the dye by the irradiation of ultraviolet light is unavoidable.
4. With a solid ink, any recording medium can be applied. However, since a soft material, or a wax is used, printed dots thereof are readily rubbed off even by weak frictional force. In general, inks containing an organic solvent develop a solvent-like odor, and hence present an environmental problem.
5. The ink in which a sublimable dye is used in an ultraviolet-curing resin is required to be heated to 120° C. to 180° C. Therefore, the recording media to be used are limited.

SUMMARY OF THE INVENTION

It is therefore an object of the present invention to provide an ink which can be applied to any recording medium and which permits recording with good weathering resistance and good print quality, and an ink-jet recording method and recording instruments using such an ink.

The above object can be achieved by the present invention described below.

According to the present invention, there is provided an ink comprising a pigment, a water-soluble resin, a water-soluble monomer to be set by application of energy and a photopolymerization initiator in an aqueous liquid medium.

According to the present invention, there is also provided an ink-jet recording method comprising applying droplets of an ink formed by an ink-jet system to a recording medium to conduct recording, wherein the ink described above is used as said ink.

According to the present invention, there is further provided an ink cartridge comprising an ink container portion with an ink held therein, wherein the ink described above is used as said ink.

According to the present invention, there is still further provided a recording unit comprising an ink container portion with an ink held therein and a head from which the ink is ejected in the form of ink droplets, wherein the ink described above is used as said ink.

According to the present invention, there is yet still further provided an ink-jet recording apparatus by which droplets of an ink formed by an ink-jet system are applied to a recording medium to conduct recording, wherein the apparatus comprises the ink cartridge or recording unit described above.

DESCRIPTION OF THE PREFERRED EMBODIMENTS

Examples of the monomer set by application of energy, which is useful in the practice of the present invention, include ultraviolet-polymerizing monomers. Radical-polymerizable acrylic monomers and epoxy monomers applicable to a cationic polymerization system may be suitably used.

As the radical-polymerizable acrylic monomers, the following compounds are particularly preferred because they are excellent in coloring material-receptive property:

N,N-dimethylaminoethyl methacrylate, $CH_2=C(CH_3)—COOCH_2CH_2N(CH_3)_2$;

N,N-dimethylaminoethyl acrylate, $CH_2=CH—COO—CH_2CH_2N(CH_3)_2$;

N,N-dimethylaminopropyl methacrylate, $CH_2=C(CH_3)COO—CH_2CH_2CH_2N(CH_3)_2$;

N,N-dimethylaminopropyl acrylate, $CH_2=CH—COOCH_2CH_2CH_2N(CH_3)_2$;

N,N-dimethylacrylamide, $CH_2=CH—CON(CH_3)_2$;

N,N-dimethylmethacrylamide, $CH_2=C(CH_3)—CON(CH_3)_2$;

N,N-dimethylaminoethylacrylamide, $CH_2=CH—CONHC_2H_4N(CH_3)_2$;

N,N-dimethylaminoethylmethacrylamide, $CH_2=C(CH_3)CONHC_2H_4N(CH_3)_2$;

N,N-dimethylaminopropylacrylamide, $CH_2=CH—CONHC_3H_6N(CH_3)_2$;

N,N-dimethylaminopropylmethacrylamide, $CH_2=C(CH_3)CONHC_3H_6N(CH_3)_2$; and quaternized products thereof.

There may also be used ultraviolet-curing monomers and oligomers known per se in the art, such as (meth)acrylates of polyhydric alcohols, (meth)acrylates of polyhydric alcohol glycidyl ethers, (meth)acrylates of polyethylene glycol, (meth)acrylates of addition products of a polyhydric alcohol and ethylene oxide, and reaction products of a polybasic acid anhydride and a hydroxyl group-containing (meth)acrylic ester. Among these substances, one high in compatibility with a pigment used and having a hydrophilic nature is chosen for use.

As the epoxy monomers applicable to a cationic polymerization system, may be used glycidyl ethers and esters of polyhydric alcohols, cycloaliphatic epoxides and the like.

Since a pigment is used as a coloring material in the present invention, the setting speed of the monomer tends to become slow. Therefore, as a polymerization system of the UV-polymerizing monomer, a monomer of a hybrid polymerization system, in which vinyl ethers and acryloyl compounds are concurrently used, is most desirable. Next, the monomer of a cationic polymerization system and a free radical polymerization system are chosen in that order. In case a momomer having a polyfunctional group is used, its amount used is preferably within a range of from 1 to 10% by weight based on the total weight of the ink.

The photopolymerization initiator may be used either singly or in any combination of two or more compounds thereof. The photopolymerization initiator may be used together with a sensitizing agent. The selection, combination and mixing ratio of the photopolymerization initiator and sensitizing agent may be suitably determined according to an ultraviolet-curing monomer and an apparatus to be used.

Principal examples of the photopolymerization initiator and the sensitizing agent include acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bisdiethylaminobenzophenone, Michler's ketone, benzil, benzoin, benzoin methyl ether, benzoin ethyl ether, benzoin isopropyl ether, benzoin n-propyl ether, benzoin isobutyl ether, benzoin n-butyl ether, benzyldimethylketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenyl ketone, 2-hydroxy-2-methyl-1-phenyl-1-on, 1-(4-isopropylphenyl)-2-hydroxy-2-methylpropan-1-on and methylbenzoyl formate for the polymerization initiators. The amount used is generally 0.1 to 10% by weight based on the total weight of the ultraviolet-curing resin. With respect to the cationic polymerization type, photopolymerization initiators such as aromatic diazonium salts, aromatic halonium salts, aromatic sulfonium salts and metallocene compounds may be used. Specific examples thereof include triphenylsulfonium hexafluorophosphate, diphenyliodinium hexafluoroantimonate and the like. In the case of the cationic polymerization type, the monomer is desirably heated within a range of from 80° C. to 170° C., particularly preferably from 100° C. to 150° C. for complete setting. The heating time is generally between 5 and 30 minutes though it may vary according to conditions.

The sensitizing agents include:
1. amine type: aliphatic amines, aromatic group-containing amines and piperidine;
2. urea derivatives: allyl type and o-tolylthiourea;
3. sulfur compounds: sodium diethyldithiophosphate and soluble salts of aromatic sulfinic acids;
4. nitrile compounds: N,N-di-substituted p-aminobenzonitriles (the substituent groups on each N being a methyl, ethyl, β-cyanoethyl or β-chloroethyl group);
5. phosphorus compounds: tri-n-butylphosphine and sodium diethyldithiophosphide;
6. nitrogen compounds: Michler's ketone, N-nitrosohydroxylamine derivatives, oxazolidine compounds, tetrahydro-1,3-oxazine compounds and condensates of formaldehyde or acetoaldehyde with a diamine;
7. chlorine compounds: carbon tetrachloride and hexachloroethane; and
8. high-molecular amines composed of a reaction product of an epoxy resin with an amine, and triethanolamine triacrylate.

As the pigment useful in the practice of the present invention, may be used all the organic and inorganic pigments conventionally known. Examples thereof include azo pigments such as azo lakes, insoluble azo pigments, condensed azo pigments and chelated azo pigments; polycyclic pigments such as phthalocyanine pigments, perylene and perylene pigments, anthraquinone pigments, quinacridone pigments, dioxazine pigments, thioindigo pigments, isoindolinone pigments, and quinophthalone pigments; dye lakes such as basic dye lakes and acid dye lakes; organic pigments such as nitro pigments, nitroso pigments, aniline black and daylight fluorescent pigments; and inorganic pigments such as titanium oxide, iron oxides and carbon black. Any pigment not described in COLOR INDEX may also be used so far as it can be dispersed in an aqueous medium.

If a dye is used in combination with the pigment, any dye conventionally used in the field of ink-jet recording may be used. Examples thereof include azo dyes and phthalocyanine dyes as direct dyes, and azo dyes and anthraguinone dyes as acid dyes. A weight ratio of the pigment to the dye may preferably be within a range of from 8:2 to 2:8, more preferably from 7:3 to 3:7 though it varies according to the kinds of the pigment and dye used.

It is preferable that the water-soluble resin (dispersant resin) contained in the ink according to the present invention for dispersing the pigment therein be soluble in a solution with an amine or a base dissolved in water and have a weight average molecular weight ranging from 3,000 to 30,000, more preferably from 5,000 to 15,000. Examples of water-soluble resins usable in the present invention include styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinylnaphthalene-acrylic acid copolymers, vinylnaphthalene-maleic acid copolymers, styrene-maleic anhydride-maleic half ester copolymers and salts thereof.

As a method of measuring the weight average molecular weight of such a water-soluble resin as described above, may be mentioned various methods. However, it is generally measured by GPC (gel permeation chromatography) or the like.

The ink according to the present invention is preferably adjusted to neutrality or alkalinity as a whole because it can be provided as an ink improved in the solubility of the above-described water-soluble resin and having excellent long-term storage stability. It is desirable that the pH of the ink be adjusted within a range of preferably from 7 to 10 because a higher pH may cause corrosion various members used in an ink-jet recroding apparatus.

Examples of a pH adjustor used in the aqueous medium according to the present invention include various organic amines such as diethanolamine and triethanolamine, inorganic alkalis such as the hydroxides of alkali metals, for example, sodium hydroxide, lithium hydroxide, potassium hydroxide, etc., organic acids, and mineral acids.

In the above-described manner, the pigment and water-soluble resin are dispersed or dissolved in an aqueous medium.

An aqueous medium suitable for use in the ink according to the present invention is a mixed solvent of water and a water-soluble organic solvent. As the water, it is preferable to use ion-exchanged water (deionized water) instead of tap water containing various ions.

Examples of the water-soluble organic solvent used in combination with water may include alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, hexylene glycol and diethylene glycol; thiodiglycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; and the like.

Among a number of these water-soluble organic solvents, the organic amine is contained in the ink according to the present invention in an amount of preferably 0.001 to 10% by weight based on the total weight of the ink for neutralizing a dispersant and maintaining the ink neutral to alkaline.

With respect to the water-soluble organic solvents other than the organic amines, they may be suitably selected as desired, and contained in a proper amount. Of these, however, the polyhydric alcohols such as diethylene glycol and the lower alkyl ethers of polyhydric alcohols, such as triethylene glycol monomethyl (or monoethyl) ether are preferred.

It has been further found that in order to achieve good ejection stability, it is effective to add an aliphatic monohydric alcohol, for example, ethanol or isopropyl alcohol in an amount of 3% or more because the addition of these solvents is considered to permit more stable bubbling of the resulting ink on a thin film resistor.

As a further effect of these solvents, may be mentioned the fact that the addition of these solvents to the dispersion can inhibit foaming upon formation of the dispersion, and so the dispersion treatment can be conducted more efficiently.

The ink according to the present invention may contain, in addition to the above components, surfactants, antifoaming agents, antiseptics and the like as needed to provide it as an ink having desired physical properties. Commercially-available water-soluble dyes and/or the like may also be added thereto.

Examples of the surfactants include anionic surfactants such as fatty acid salts, salt of higher alcohol sulfates, salts of liquid fatty oil sulfates and alkylallylsulfonates; and nonionic surfactants such as polyoxyethylene alkyl ethers, polyoxyethylene alkyl esters and polyoxyethylene sorbitan alkyl esters. These surfactants may be suitably chosen for either single use or combined use. The amount of the surfactants to be used may vary according to the kind of the dispersing agent used. However, it may desirably be within a range of from 0.01 to 5% by weight based on the total weight of the ink.

In this case, it is preferred that the amount of the surfactants added be determined in such a manner that the surface tension of the resulting ink is 30 dyne/cm or higher. If the surface tension is lower than this value, such an ink brings about undesirable situations such as slippage upon printing (defective ink-droplet impact) due to wetting on orifices.

As the performance characteristics required of inks for ink-jet, may be generally mentioned physical properties such as the viscosity, surface tension and pH of the inks. In a dispersion system such as a water-based pigment ink, however, bubbling in the ink has become unstable in many cases even if it has met these performance characteristics.

Therefore, the present inventors have carried out an extensive investigation as to the performance characteristics of a water-based ink which is thermally stable and permits optimum bubbling. As a result, it has been found that when the amount of the water-soluble resin dissolved in the ink is limited to not more than 2% by weight, preferably not more than 1% by weight based on the total weight of the ink, the ink reliably bubbles on a thin film resistor even under various drive conditions, and generates no deposit on the resistor over a long period of time. More specifically, when the water-soluble resin is present in the ink in excess of the amount required for the pigment, the ink does not bubble even if predetermined thermal energy is applied to the ink on the thin film resistor, and an excess amount of the water-soluble resin becomes insoluble matter due to heat upon application of pulses and accumulates on the thin film resistor, which causes ejection failure and uneven printing.

Here, the term "water-soluble resin dissolved in the ink" means a resin dissolved in the liquid medium in the ink, and not adsorbed on the pigment. One measure for reducing the amount of the dissolved water-soluble resin is to control the weight ratio of the pigment to the water-soluble resin upon the preparation of the ink within a range of from 3:1 to 30:1, preferably from 10:3 to 30:1.

Further, the total amount of the pigment and the water-soluble resin in the dispersion may preferably be not less than 10% by weight, but not more than 30% by weight. The reason for this is that the dispersion treatment can not be conducted efficiently to reach an optimum dispersion state unless the pigment and the water-soluble resin exist in the dispersion in a certain concentration or higher.

With respect to the preparation process of the water-soluble pigment dispersion according to the present invention, the pigment is first added to an aqueous solution containing at least a water-soluble resin (dispersant resin), an amine and water, and the mixture is stirred. A dispersion treatment is then conducted in accordance with a dispersing technique, which will be described subsequently, and if necessary, a centrifugal treatment is carried out to obtain a desired dispersion. Other components including polymethyl methacrylate, such as those described above, are then added to this dispersion, and .the resulting mixture is stirred, thereby preparing an ink.

Here, the ink according to the present invention is preferably adjusted to a viscosity of 10 cP or lower.

In particular, in order to adjust the amount of the water-soluble resin (the resin not adsorbed on the pigment) dissolved in the ink to 2% by weight or less, it is necessary to stir an aqueous solution containing the resin, an amine and water at 60° C. or higher for at least 3 minutes in the preparation process to completely dissolve the resin in advance.

It is also necessary to add the amine or base required to dissolve the resin in an amount at least 1.2 times of the amount of the amine or base calculated out from the acid value of the resin. This calculated amount of the amine or base is found in accordance with the equation $$\text{Amount of amine (g)} = \frac{\text{Acid value of resin} \times \text{Molecular weight of amine} \times \text{Amount of resin (g)}}{56000}.$$

It is further necessary to conduct premixing for at least 30 minutes prior to the dispersion treatment of the aqueous solution containing the pigment. This premixing serves to improve the wettability of the surface of the pigment and facilitates adsorption on the pigment surface.

Preferred examples of the amines added to the dispersion include organic amines such as monoethanolamine, diethanolamine and triethanolamine, and ammonia.

Any dispersing machine routinely used may be employed as a dispersing machine used in the present invention. As examples thereof, may be mentioned ball mills, roll mills and sand mills.

Of these mills, high-speed sand mills are preferred. Examples thereof include Super Mill, Sand Grinder, Beads Mill, Agitator Mill, Grain Mill, Dyno Mill, Pearl Mill, Coball Mill (all, trade names), etc.

In the present invention, as a method of obtaining a pigment having a desired particle size distribution, there may be used a technique in which the size of a grinding medium in a dispersing machine is made smaller, in which the packing rate of a grinding medium is made higher, in which processing time is made longer, in which discharging rate is made lower, or in which classification is conducted by a filter, a centrifugal separator or the like after grinding. Any combination thereof may also be used.

As a method of measuring the amount of the water-soluble resin (the resin not adsorbed on the pigment) dissolved in the ink according to the present invention, there may be suitably used a method in which the pigment and the resin adsorbed on the pigment are precipitated by means of an ultracentrifugal separator or the like, and the amount of the residual resin contained in the supernatant liquid is determined by a TOC (total organic carbon) meter, a gravimetric method (a method in which the supernatant liquid is evaporated to dryness to measure the amount of the resin), or the like.

The ink according to the present invention is a water-based ink. The water content is preferably at least 50% by weight based on the total weight of the ink.

The ink-jet recording method using the ink of the present invention is an ink-jet recording method in which at least one ink is applied to a recording medium lacking in ink absorptiveness from a recording head equipped with a plurality of ink ejection orifices to form a recorded image. The method includes the first process in which the surface of the recording medium is subjected to a cleaning treatment, the second process in which droplets of the ink are ejected from the ejection orifices of the recording head according to image recording signals to apply the ink droplets to the recording medium at predetermined positions thereof, thereby forming a recorded image, and the third process in which the ink applied to the recording medium is set.

In the ink-jet recording method according to the present invention, the second process is preferably performed by a bubble-jet recording system in which the droplets of the ink are ejected by the action of thermal energy.

An ink-jet recording apparatus which may be used in the ink-jet recording method of the present invention is an ink-jet recording apparatus by which at least one ink is applied to a recording medium lacking in ink absorptiveness from a recording head equipped with a plurality of ink ejection orifices to form a recorded image, and comprises:

a) a means for subjecting the surface of the recording medium to a cleaning treatment,
  b) a recording head equipped with a plurality of ink ejection orifices and adapted to eject droplets of the ink according to image recording signals to apply the ink droplets to the recording medium at predetermined positions thereof, and
  c) a means for setting the ink droplets forming the image.

The means of a) in the apparatus according to the present invention may be omitted according to the recording medium to be used. As a cleaning technique, may be mentioned UV/$O_3$ cleaning.

As the means of c), may be mentioned a UV lamp, EB and heat. In the UV lamp, there is a possibility that it may generate heat to deform the recording medium. Therefore, it is preferable to provide a cooling mechanism, for example, a cold mirror, a cold filter, a work cooler or the like.

An exemplary recording apparatus according to the present invention, which can be used in the ink-jet recording method, will hereinafter be described.

Figure 3:
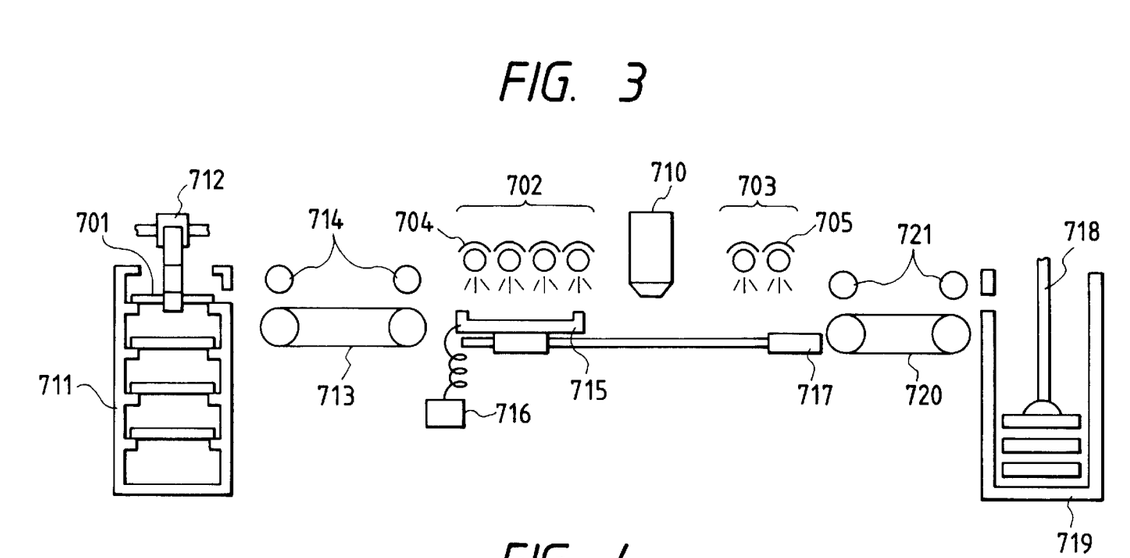
FIG. 3 is a typical schematic view illustrating principal parts of an exemplary ink-jet recording apparatus according to the present invention.

FIG. 3 is a typical schematic view illustrating the whole of the recording apparatus. In FIG. 3, numeral 710 indicates a recording head, which is an ink-jet recording head having 64 nozzles in 360 dpi. The apparatus is equipped with 4 recording heads for four colors of Y (yellow), M (magenta), C (cyan) and Bk (black), and these heads are set so as to permit the recording of a full-color image by one scan. Numeral 701 designates a recording medium. A plurality of the recording media 701 is preset in a stocker 711 and fed one by one to a belt conveyer 713 by a carrier 712 and then to a printing tray 715. Numeral 714 indicates an auxiliary roller for feeding. The recording medium 701 fed to the printing tray 715 is tightly held on the tray under suction by a pump 716, whereby the recording medium 701 on the tray 715 is fed into a zone in which the first treatment process is performed. Numeral 704 designates a UV/$O_3$ lamp. If the recording medium is low in surface wettability, this surface treatment is conducted to improve its wettability and adhesion affinity for an ink. This treatment process may be omitted.

Once the recording medium 701 is discharged from the first process zone by a feed motor 717, ink-jet recording is immediately performed on the recording medium 701 by the recording head 710. Various ink-jet recording systems such as a piezo system and an electrostatic system may be used in this ink-jet recording, or the second process. However, a bubble-jet system which can stably conduct high-speed recording is preferred.

As a recording method, two- or four-pass printing is adopted if problems of bleeding and the like are offered in case of one-pass printing.

The recording medium on which an image has been recorded is immediately fed to a zone in which the third treatment process is performed. Here, numeral 705 indicates a UV lamp.

Since there is a possibility that heat generated by lighting the UV lamp may deform the recording medium, it is necessary to provide a heating preventing mechanism such as a cold mirror, a cold filter or a work cooler (not illustrated).

The recording medium (a print having a recorded image) subjected to the above three treatment processes is fed to a stocker 719 through a belt conveyer 720 and feed rollers 721, and received at a predetermined position by a handler 718.

Figure 5:
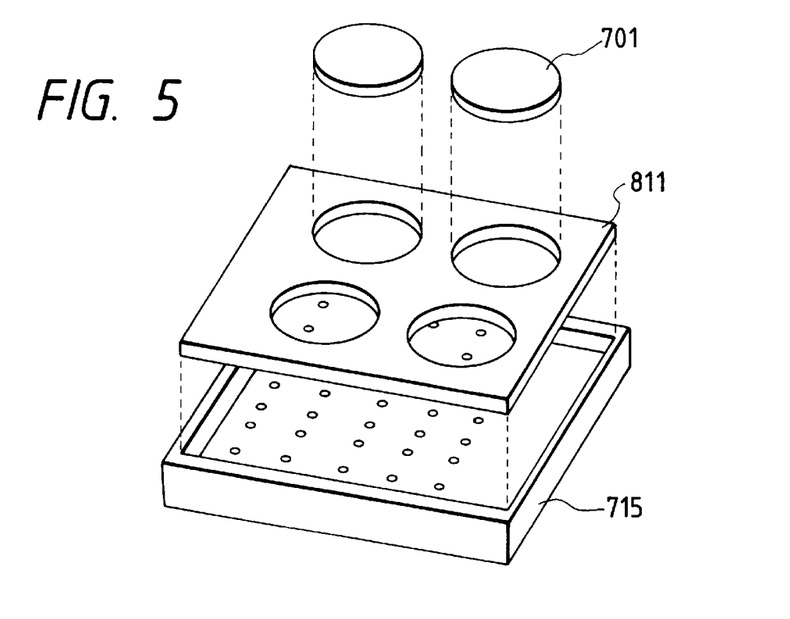
FIG. 5 illustrates an example of the construction of a tray used in the ink-jet recording apparatus according to the present invention.

In the illustrated embodiment, the recording medium 701 is in the form of a plate. However, the tray for feeding this medium may be suitably regulated so as to correspond to the shape of the recording medium. For example, the use of a spacer 811 as illustrated in FIG. 5, or the like permits the accommodation of a disk-like recording medium to recording. It is desirable that the device should have a means for adjusting the distance between the recording head and the image-forming surface of the recording medium according to the thickness of the recording medium.

In order to facilitate the heating or setting in the first or third process, a heating means such as a heater may be provided as an auxiliary means in the tray to heat, for example, the recording medium prior to the respective treatments, whereby heating efficiency is enhanced even in the treatment of a relatively large-sized recording medium having a great heat capacity, and so the treatment can be conducted effectively.

Figure 6:
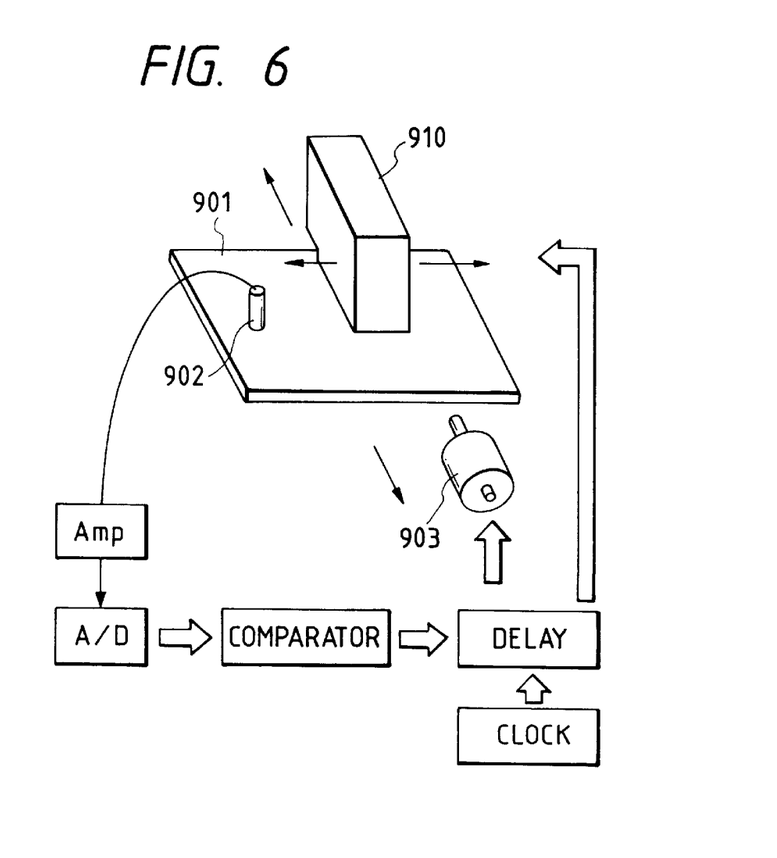
FIG. 6 illustrates an exemplary position compensating system following the temperature of an image-forming surface of a recording medium upon alignment of the recording medium and a recording head in the ink-jet recording apparatus according to the present invention.

If the heating treatment causes dimensional distortion due to thermal expansion, and hence deviation of recording in both the width direction and the feeding direction, whereby problems of occurrence of white stripes on a recorded image, deviation of printing size, and the like occur, it is preferable to use, for example, a system as illustrated in FIG. 6, in which the surface temperature of the image-forming surface of a recording medium 901 is detected by a temperature sensor 902, a signal thereof is amplified by an amplifier (Amp), and the amplified signal is digitized by an A/D convertor (A/D) and then compared with a preset value by a comparator, thereby sending a signal in the form of an optimum delay signal for a signal from a clock to a recording head 910 and a motor 903 and regulating the recording medium so as to permit setting at the right position.

In order to feed the recording medium with high precision, it is also possible to put a mark on a nonprinting area of the recording medium by etching or pressing to read that position by a proper reading means, thereby always confirming the position of the recording medium and controlling feeding means according to that position to feed the recording medium with higher precision. If warpage or the like occurs on the recording medium, it is also effective to add a warpage-straightening function to rollers or the like to correct the warpage. If the above mark impairs the value of the product, the mark may be removed by a means such as shearing press after the printing.

Figure 4:
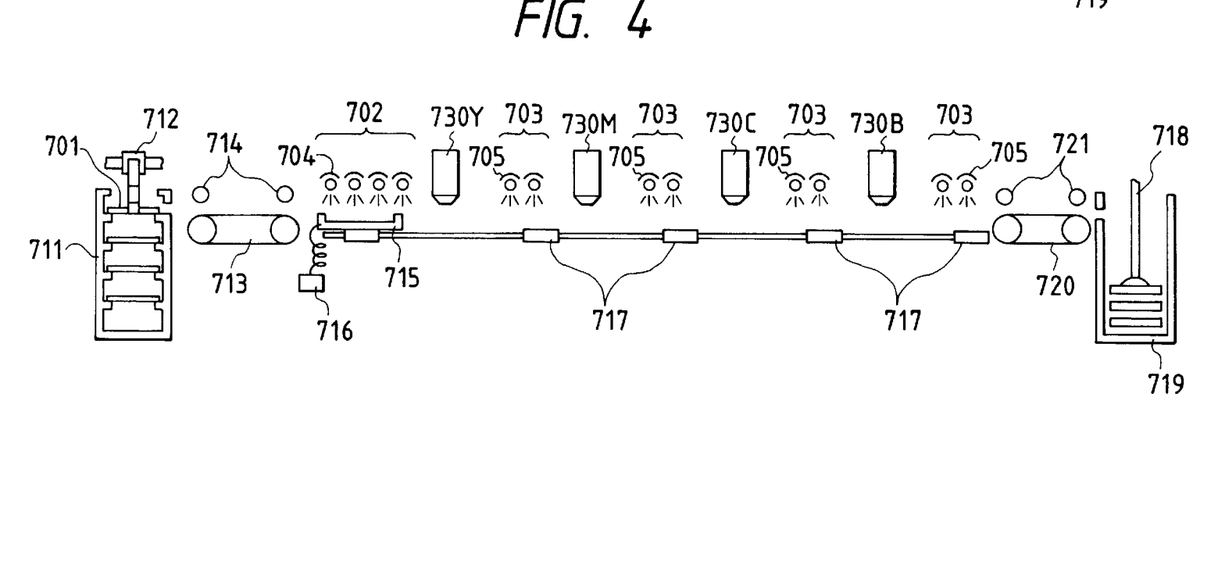
FIG. 4 is a typical schematic view illustrating another exemplary ink-jet recording apparatus according to the present invention.

FIG. 4 is a typical schematic view illustrating the whole of another recording apparatus. In FIG. 4, numeral 730 indicates a recording head, for example, an ink-jet recording head having 64 nozzles in 360 dpi. This apparatus has four recording heads of this kind, i.e., 730Y, 730M, 730C and 730B which serve to print colors of Y (yellow), M (magenta), C (cyan) and B (black), respectively.

After yellow-color printing is conducted by the head 730Y, ultraviolet light is emitted from a UV lamp 705 to expose a recording medium to the ultraviolet light to such extent that at least the surface of the ink is set.

The recording medium 701 on a feeding tray 715 is fed to a position of the next ink-jet recording head 730M by a feed motor 717 to conduct magenta-color printing. After the printing, the surface of the ink is set by another UV lamp 705. Thereafter, printing is conducted repeatedly at positions of the recording heads 730C and 730B to form a full-color image. Details of other components are the same as those described in FIG. 3.

In FIGS. 3 and 4, the UV irradiation is performed after printing with the individual inks of different colors.

However, a spot UV lamp (not illustrated) may be arranged at the side of each ink cartridge to conduct UV irradiation after each pass.

The present invention will hereinafter be described in more detail by the following Examples. In the following description, the terms "%" is by weight, unless otherwise noted.

EXAMPLE 1

Inks each having the following composition were prepared. Incidentally, 4 pigment dispersions of different colors were prepared.

| | |
|---|---|
| (1) Ultraviolet-polymerizing monomer*[1] | 7.4% |
| (2) Photopolymerization initiator*[2] | 0.4% |
| (3) Aqueous pigment dispersion*[3] | 73.8% |
| (pigment/water-soluble resin/water) | |
| (4) Surfactant*[4] | 7.4% |
| (5) Water-soluble solvent*[5] | 11.1% |

*[1]: NK Ester A-400 (product of Shin-Nakamura Chemical Co., Ltd.)
$CH_2=CH-CO-O(CH_2-CH_2-O)_nOC-CH=CH_2$ (n = 9)
*[2]: Irgacure 651 (product of Ciba-Geigy AG)

*[3]: Cyan (solids content of pigment: 16%)
Magenta (solids content of pigment: 16%)
Yellow (solids content of pigment: 16%)
Black (solids content of pigment: 16%)
*[4]: 10% Aqueous solution of Noigen ET 150 (product of Dai-ichi Kogyo Seiyaku K.K.)
*[5]: Isopropyl alcohol (IPA) and diethylene glycol (DEG).

Figure 1:
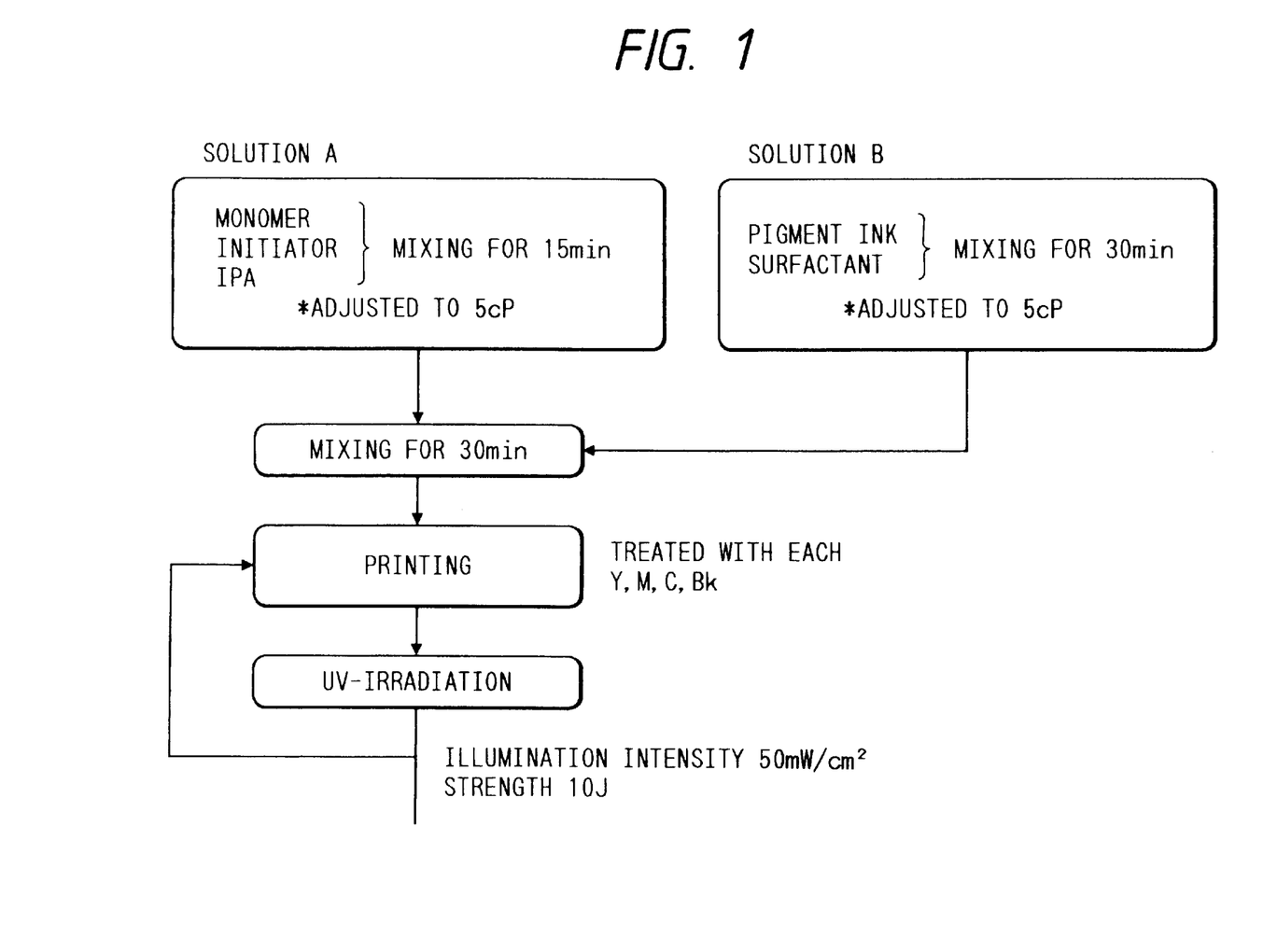
FIG. 1 illustrates a process flow chart for the preparation of an ink according to an embodiment of the present invention.

The above components were used to prepare the inks in accordance with the flow chart shown in FIG. 1. Using the thus-prepared inks, an image was formed on an acrylic and a polycarbonate.

First, 0.1 g of Irgacure 651 was added to 2 g of NK Ester A-400, and the resulting mixture was stirred for about 10 minutes. IPA was further added, and the resulting mixture was stirred for 5 minutes to adjust its viscosity to 5 cP, thereby preparing Solution A.

Next, 2 g of Noigen (10% aqueous solution) was added to 20 g of each pigment dispersion (pigment/water-soluble resin/water), and the resulting mixture was stirred for 30 minutes, thereby preparing Solution B. The pigment dispersion was adjusted to 5 cP in advance.

Solution A and Solution B were mixed with each other in such a manner that a ratio of the pigment dispersion to the monomer was 10:1, and the mixture was stirred for 30 minutes, thereby preparing an ultraviolet-curing ink. With respect to this mixing ratio, there are tendencies for ejection properties to deteriorate and at the same time for the glossy feeling of the printed and cured product to be reduced as the monomer component increases.

Figure 2:
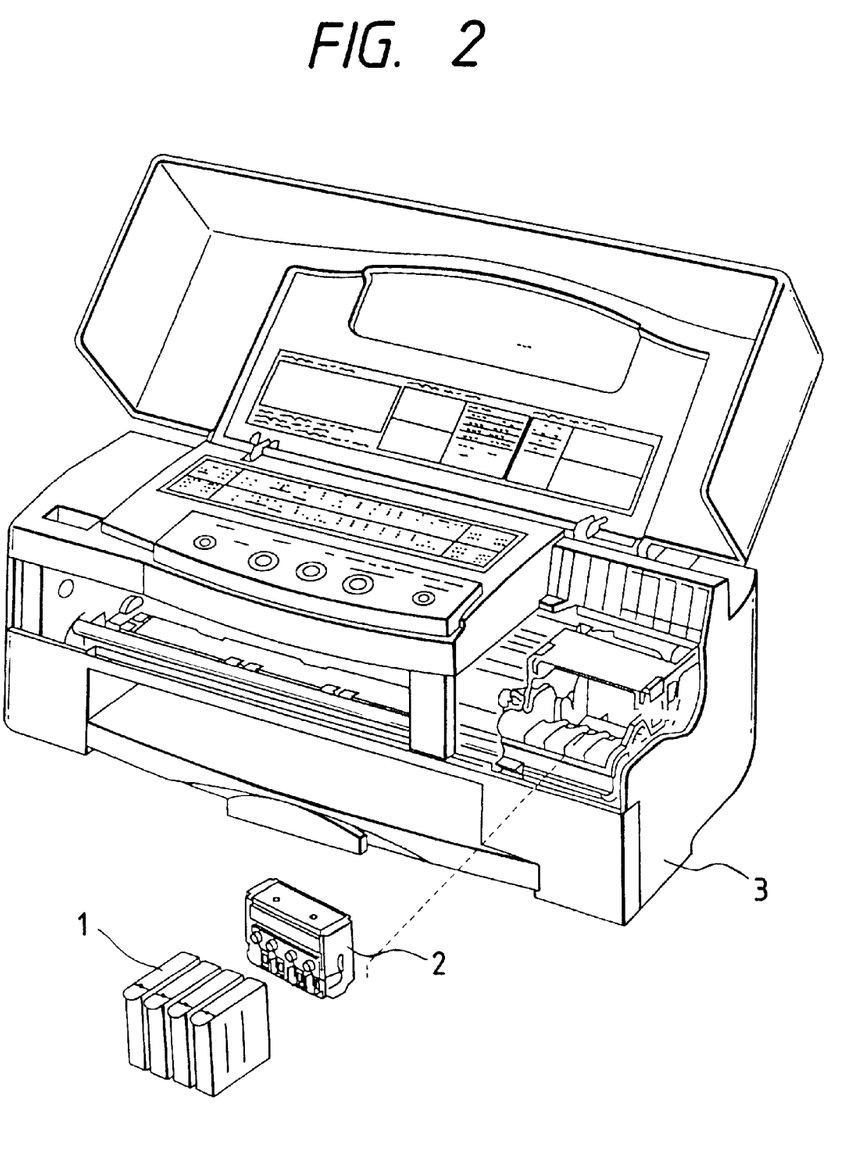
FIG. 2 illustrates an exemplary ink-jet recording apparatus using the ink according to the present invention.

The yellow ink having the above-described composition was first used. Printing was conducted with the yellow ink by such an ink-jet printer as illustrated in FIG. 2. After the printing, the printed area was exposed to ultraviolet light. The irradiation intensity of the ultraviolet light at this time was 10J. At this point in time, the yellow ink was set to such a hardness that it feels sufficiently hard when touched with one's finger.

Printing was then conducted with the magenta ink having the above-described composition so as to overlap the printed area of the yellow ink. After the printing, the printed area was exposed to ultraviolet light to confirm the setting of the magenta ink.

In this example, an acrylic and a polycarbonate were used as recording media.

The overlapped areas of the inks were observed through an optical microscope. However, there was no indication that bleeding occurred there, and the print quality was hence good. These inks were also good in adhesion property to the recording media and were not rubbed off from the media.

No color fading due to the ultraviolet-light irradiation was also recognized.

In this example, when an SN Leveler H907 (product of San Nopco Limited) was added to the inks having the above-described composition in a proportion of 0.5% by weight based on the monomer, their rub-off resistance was improved.

Further, the addition of a small amount of thioglycol as an additive was able to prevent the inks from crusting in a nozzle, and so their printing performance was improved.

The ultraviolet-light irradiation was performed after the printing with the individual inks of different colors. According to this process, the inks did not bleed either when the subsequent printing was conducted with another ink after one ink used in the preceding printing was completely set (10J), or when the subsequent printing was conducted after only the surface of one ink was set (1J). Therefore, a good color image was able to be formed in each irradiation process.

EXAMPLE 2

Inks each having the following composition were prepared. Incidentally, 4 pigment dispersions of different colors were used.

| | |
|---|---|
| Ultraviolet-polymerizing monomer*[1] | 7.4% |
| Photopolymerization initiator*[2] | 0.4% |
| Aqueous pigment dispersion*[3] | 73.8% |
| (pigment/water-soluble resin/water) | |
| Surfactant*[4] | 7.4% |
| IPA | 6.7% |
| Water | 4.4% |

*[1]: LR8765 (product of BASF AG)
Diepoxyacrylic ester of 1,4-butanediol.
*[2]: Irgacure 651 (product of Ciba-Geigy AG)

*[3]: Cyan (solids content of pigment: 16%)
Magenta (solids content of pigment: 16%)
Yellow (solids content of pigment: 16%)
Black (solids content of pigment: 16%)
*[4]: 10% Aqueous solution of Noigen.

The preparation process of the inks and the printing process were the same as those described in Example 1. Printing was performed with these inks on an acrylic and a polycarbonate. The print quality was good. The adhesion property of the inks to the recording media was also good. They were not rubbed off from the recording media.

EXAMPLE 3

Inks each having the following composition (by weight) were prepared in accordance with the following flow chart. The substances used are the same compounds (names) as those described in Example 1.

Since the ultraviolet-polymerizing monomer and the photopolymerization initiator were separately stored, storability of the inks was good without causing gelation due to dark reaction.

EXAMPLE 4

Inks having their corresponding compositions shown in Table 1 were prepared.

First, a weight ratio of an ultraviolet-curing monomer to a photopolymerization initiator was regulated to 1:0.05 to mix such compounds. The resulting mixture was stirred for about 10 minutes. IPA was further added in an amount 1.5 times of the weight of the monomer, and the resulting mixture was stirred for 5 minutes to adjust its viscosity to 5 cP, thereby preparing Solution C.

Next, each pigment dispersion (pigment/water-soluble resin/water) and its corresponding dye solution (dye/water) were mixed to give a mixing ratio of 10:0, 8:2, 5:5, 2:8 or 0:10, thereby preparing Solution D.

Solution C and Solution D were mixed with each other in such a manner that a ratio of Solution D to the monomer was 10:1, and the resultant mixture was stirred for 30 minutes, thereby preparing an ultraviolet-curing ink. With respect to this mixing ratio, there are tendencies for ejection properties to deteriorate and at the same time for the glossy feeling of the printed and cured product to be reduced as the monomer component increases. Therefore, the ratio of Solution D to the monomer was determined to be 10:1.

Four pigments and four dyes of different colors were used in this example. Using the inks thus obtained, printing was conducted by an ink-jet printer. After the printing, the printed area was exposed to ultraviolet light. The thus-obtained print samples were tested as to light fastness in accordance with the following testing ethod. OD values of the print samples after the exposure to ultraviolet light, results of the test as to the light fastness and viscosities of the inks are shown collectively in Table 1.

(Testing method of light fastness)

A solid pattern of 2 cm×2 cm was printed on a polycarbonate resin sheet with each of the ultraviolet-curing inks. After the printing, the print sample thus obtained was exposed to ultraviolet light having its corresponding intensity shown in Table 1 to cure the ink. The thus-cured test sample of solid pattern was set in an Atlas Xenon Fade-O-meter to continuously conduct an exposure test for 100 hours. The reflection density of the test sample was measured before and after the exposure test to determine the percent retention R of OD in accordance with the following equation:

$$R=[OD \text{ after the exposure}/OD \text{ before the exposure}]\times 100$$

The light fastness of the test sample was ranked in accordance with the following standard:

AA: $R \geq 90$

A: $90 > R \geq 80$

B: $80 > R \geq 60$

C: $60 > R$.

Besides, the OD of the print sample after the exposure was ranked in accordance with the following standard:

AA: OD≧1.2
A: 1.2>OD≧1.1
B: 1.1>OD.

diepoxyacrylic ester of 1,4-butanediol (LR8765, product of BASF AG) was used as an ultraviolet-polymerizing monomer.

In this example, also, the setting time of the ink became faster as the proportion of the dye increased. However, the

TABLE 1

| Ultraviolet-[1] curing monomer (%) | 10% Aqueous[2] pigment dispersion (%) | 10% Aqueous[3] dye solution (%) | Photo-[4] polymerization initiator (%) | IPA (%) | Viscosity of ink (cP) | Intensity of ultraviolet light (J/cm$^2$) | OD | Light fastness |
|---|---|---|---|---|---|---|---|---|
| 8.0 | 79.7 | — | 0.4 | 12.0 | 7.3 | 10 | A | A |
| 8.0 | 63.7 | 15.9 | 0.4 | 12.0 | 6.5 | 5 | A | A |
| 8.0 | 39.8 | 39.8 | 0.4 | 12.0 | 4.1 | 2 | A | A |
| 8.0 | 15.9 | 63.7 | 0.4 | 12.0 | 3.4 | 0.3 | B | B |
| 8.0 | — | 79.7 | 0.4 | 12.0 | 3.0 | 0.1 | B | B |

[1]: NK Ester A-400 (product of Shin-Nakamura Chemical Co., Ltd.)
$CH_2=CH-CO-O(CH_2-CH_2-O)_nOC-CH=CH_2$ (n = 9).
[2]: Cyan (solids content of pigment: 10%)
Magenta (solids content of pigment: 10%)
Yellow (solids content of pigment: 10%)
Black (solids content of pigment: 10%).
[3]: Cyan (Projet Cyan; solids content of dye: 10%)
Magenta (Acid Red; solids content of dye: 10%)
Yellow (Direct Yellow; solids content of dye: 10%)
Black (Food Black; solids content of dye 10%).
[4]: Irgacure 651 (product of Ciba-Geigy AG).

The setting time of the ink became faster as the proportion of the dye increased. However, the OD value of the ink decreased with the increase of the dye, and the light fastness also decreased. Therefore, the weight ratio of the pigment to the dye is preferably within a range of from 8:2 to 2:8.

EXAMPLE 5

In order to determine a more suitable range of the weight ratio of the pigment to the dye on the basis of Example 4, the pigment and the dye were mixed to give a mixing ratio of 8:2, 7:3, 6:4, 5:5, 4:6, 3:7 or 2:8, thereby evaluating the resulting inks in the same manner as in Example 4. The results are shown in Table 2. Incidentally, the materials used were the same as those used in Example 4.

OD value of the ink decreased with the increase of the dye, and the light fastness also decreased. The effect was hence the same as in Example 4 and 5.

As described above, it has been confirmed by the ink-jet, particularly, bubble-jet recording heads that the inks and printing mechanisms according to the present invention have the following effects:

(1) images can be formed on recording media lacking in ink absorptiveness;
(2) color images good in print quality can be formed because the inks cause no bleeding therebetween;
(3) prints that are excellent in water fastness and light fastness can be provided;
(4) the inks with can be provided as inks good storability; and

TABLE 2

| Ultraviolet-[1] curing monomer (%) | 10% Aqueous[2] pigment dispersion (%) | 10% Aqueous[3] dye solution (%) | Photo-[4] polymerization initiator (%) | IPA (%) | Viscosity of ink (cP) | Intensity of ultraviolet light (J/cm$^2$) | OD | Light fastness |
|---|---|---|---|---|---|---|---|---|
| 8.0 | 63.7 | 15.9 | 0.4 | 12.0 | 6.5 | 5 | AA | AA |
| 8.0 | 55.7 | 23.9 | 0.4 | 12.0 | 5.5 | 3.8 | AA | AA |
| 8.0 | 47.8 | 31.8 | 0.4 | 12.0 | 4.7 | 2.7 | A | A |
| 8.0 | 39.8 | 39.8 | 0.4 | 12.0 | 4.1 | 2 | A | A |
| 8.0 | 31.8 | 47.8 | 0.4 | 12.0 | 3.7 | 1 | A | A |
| 8.0 | 23.9 | 55.7 | 0.4 | 12.0 | 3.5 | 0.5 | A | A |
| 8.0 | 15.9 | 63.7 | 0.4 | 12.0 | 3.4 | 0.3 | B | B |

In view of the relationship between the setting speed and the light fastness or the like, the weight ratio of the pigment to the dye is more preferably within a range of from 7:3 to 3:7.

EXAMPLE 6

Inks were prepared in accordance with the same formulations as those used in Examples 4 and 5 except that the (5) the inks are aqueous and hence favorable for the environment.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink for use in ink-jet recording, comprising
   an aqueous medium,
   a coloring material containing a pigment and a dye,
   a water-soluble resin having a weight average molecular weight in a range of from 3,000 to 30,000 for dispersing the pigment,
   a water-soluble monomer to be set by application of energy selected from the group consisting of radical-polymerizable acrylic esters of polyols with (meth) acrylic acid and epoxyacrylic esters of polyols with (meth)acrylic acid in an amount ranging from 1% to 10% by weight based on the total weight of the ink, and
   a photopolymerization initiator,
   wherein the viscosity of the ink is adjusted to 10 cP or lower, and wherein the weight ratio of the pigment to the dye is in a range of 8:2 to 2:8.

2. The ink according to claim 1, further comprising a dye.

3. The ink according to claim 1, wherein the pigment is in a dispersed state.

4. The ink according to claim 1, wherein the energy is ultraviolet light, heat or electron rays.

5. The ink according to claim 1, wherein the pH of the ink is adjusted within a range of from 7 to 10.

6. The ink according to claim 1, wherein water is contained in an amount of at least 50% by weight based on the total weight of the ink.

7. The ink according to claim 1, wherein the water-soluble resin is selected from the group consisting of styrene-acrylic acid copolymers, styrene-acrylic acid-alkyl acrylate copolymers, styrene-maleic acid copolymers, styrene maleic acid-alkyl acrylate copolymers, styrene-methacrylic acid copolymers, styrene-methacrylic acid-alkyl acrylate copolymers, styrene-maleic half ester copolymers, vinylnaphthalene-acrylic acid copolymers, vinylnaphthalene-maleic acid copolymers, styrene-maleic anhydride-maleic half ester copolymers and salts thereof.

8. The ink according to claim 1, wherein the weight ratio of the pigment to the dye is in a range of from 7:3 to 3:7.

9. An aqueous ink-jet ink comprising:
   a coloring material containing a pigment and a dye,
   a water-soluble resin for dispersing the pigment,
   a water-soluble monomer to be polymerized by applying energy, the water-soluble monomer being selected from the group consisting of radical-polymerizable acrylic esters of polyols with (meth)acrylic acid and epoxy-acrylic esters of polyols with (meth)acrylic acid, and
   a photopolymerization initiator for polymerizing the water-soluble monomer,
   wherein the weight ratio of the pigment to the dye is in a range of 8:2 to 2:8.

10. The aqueous ink-jet ink according to claim 9, wherein the weight ratio of the pigment to the dye is in a range of from 7:3 to 3:7.

* * * * *

UNITED STATES PATENT AND TRADEMARK OFFICE
CERTIFICATE OF CORRECTION

PATENT NO. : 5,952,401

DATED : September 14, 1999

INVENTOR(S) : MAKIKO KIMURA, ET AL.

It is certified that error appears in the above-identified patent and that said Letters Patent is hereby corrected as shown below:

On the title page:

Item [56] ON THE COVER PAGE: FOREIGN PATENT DOCUMENTS

"5186725" should read --5-186725--.

COLUMN 5:

Line 33, "recroding" should read --recording--.

COLUMN 14:

Line 37, "ethod." should read --method.--.

COLUMN 16:

Line 42, "with" should be deleted and "good" should read --with good--.

Signed and Sealed this

Thirteenth Day of June, 2000

Attest:

Q. TODD DICKINSON

*Attesting Officer*            *Director of Patents and Trademarks*